(12) United States Patent
Jachuck

(10) Patent No.: US 8,753,576 B2
(45) Date of Patent: Jun. 17, 2014

(54) THIN FILM TUBE REACTOR WITH ROTATING RESERVOIR

(75) Inventor: Roshan Jachuck, Slingerlands, NY (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 13/010,967

(22) Filed: Jan. 21, 2011

(65) Prior Publication Data

US 2011/0200731 A1      Aug. 18, 2011

Related U.S. Application Data

(62) Division of application No. 12/001,082, filed on Dec. 7, 2007, now Pat. No. 7,875,248.

(60) Provisional application No. 60/873,445, filed on Dec. 7, 2006.

(51) Int. Cl.
| | | |
|---|---|---|
| *B01J 19/00* | (2006.01) | |
| *B01J 19/28* | (2006.01) | |
| *B01J 19/12* | (2006.01) | |
| *B01J 10/00* | (2006.01) | |
| *B01J 19/18* | (2006.01) | |
| *B01J 10/02* | (2006.01) | |
| *B01D 61/14* | (2006.01) | |
| *B01D 61/02* | (2006.01) | |

(52) U.S. Cl.
CPC .............. *B01J 19/28* (2013.01); *B01D 61/147* (2013.01); *B01J 19/126* (2013.01); *B01J 2219/00094* (2013.01); *B01J 19/121* (2013.01); *B01J 10/007* (2013.01); *B01J 2219/00081* (2013.01); *B01D 61/025* (2013.01); *B01J 19/1887* (2013.01); *B01J 10/02* (2013.01); *B01D 61/027* (2013.01); *B01J 19/123* (2013.01); *B01J 19/006* (2013.01); *B01D 61/145* (2013.01)
USPC ........... 422/129; 422/198; 422/200; 422/209; 422/224

(58) Field of Classification Search
None
See application file for complete search history.

(56) References Cited

U.S. PATENT DOCUMENTS

| | | | | |
|---|---|---|---|---|
| 1,649,117 | A * | 11/1927 | Jones ............................... | 494/13 |
| 2,787,599 | A * | 4/1957 | Belden ............................ | 502/10 |
| 2,995,612 | A * | 8/1961 | Hervert ......................... | 585/899 |
| 3,376,360 | A * | 4/1968 | Feezel ........................... | 585/532 |
| 4,311,570 | A * | 1/1982 | Cowen et al. ............ | 204/157.41 |

* cited by examiner

*Primary Examiner* — Jennifer A Leung
(74) *Attorney, Agent, or Firm* — Gerow D. Brill

(57) ABSTRACT

A tube reactor having a substantially tubular body portion including a conical section, an entry port, an opposing exit port, and an axis extending between the ports through the body portion. The tubular body portion being rotatable about the axis. At least one reactant can be fed into the tubular body portion and directed toward the conical section. An inner surface of the tubular body portion receives the reactants from the conical section, and processes the reactants. An insert may be positioned within the tubular body portion to further process the reactants along the inner surface. A rotating reservoir having a damper can be coupled to the rotating tubular body portion. The damper receives the processed reactants from the inner surface of the tubular body portion, and guides the processed reactants into the rotating reservoir to minimize turbulence. The rotating reservoir then separates the processed reactants by density.

10 Claims, 13 Drawing Sheets

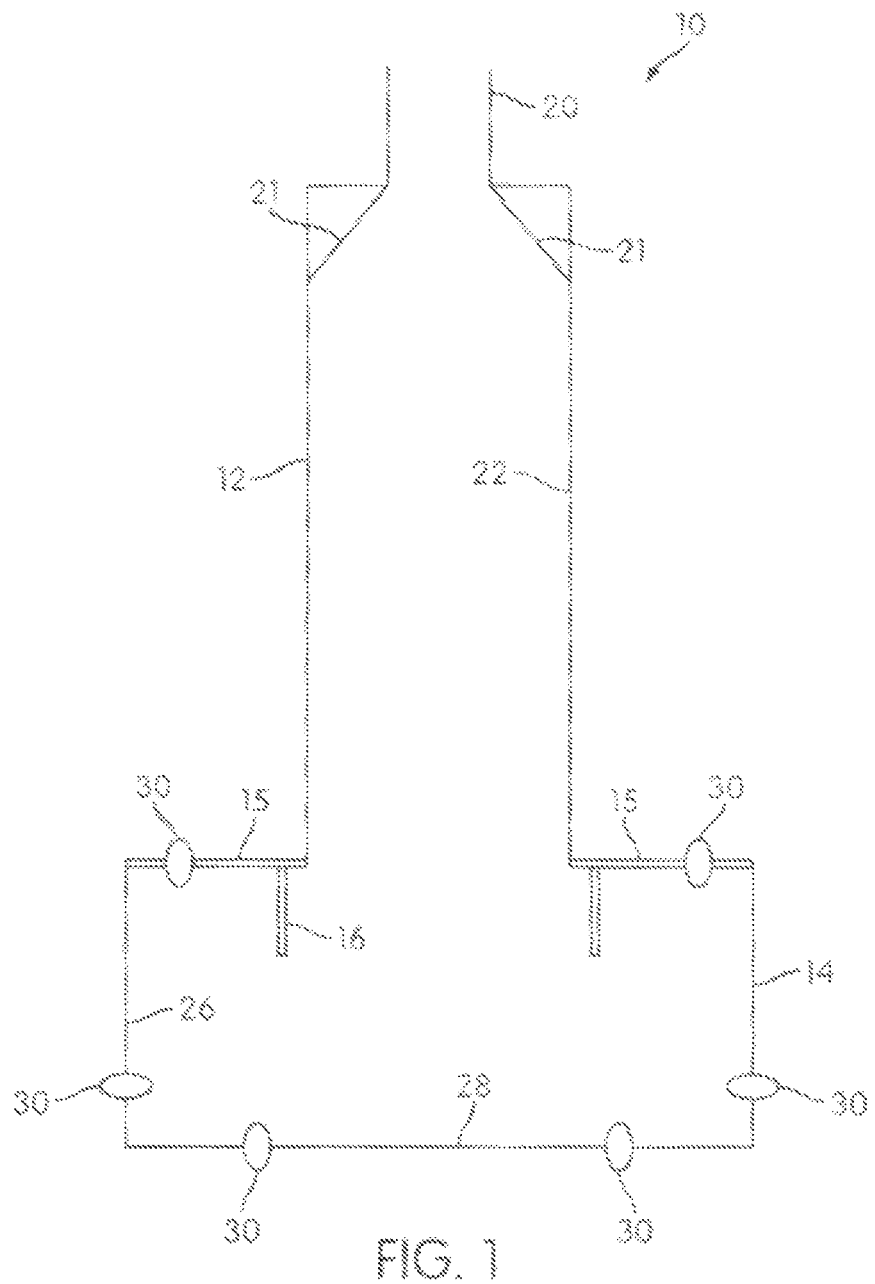

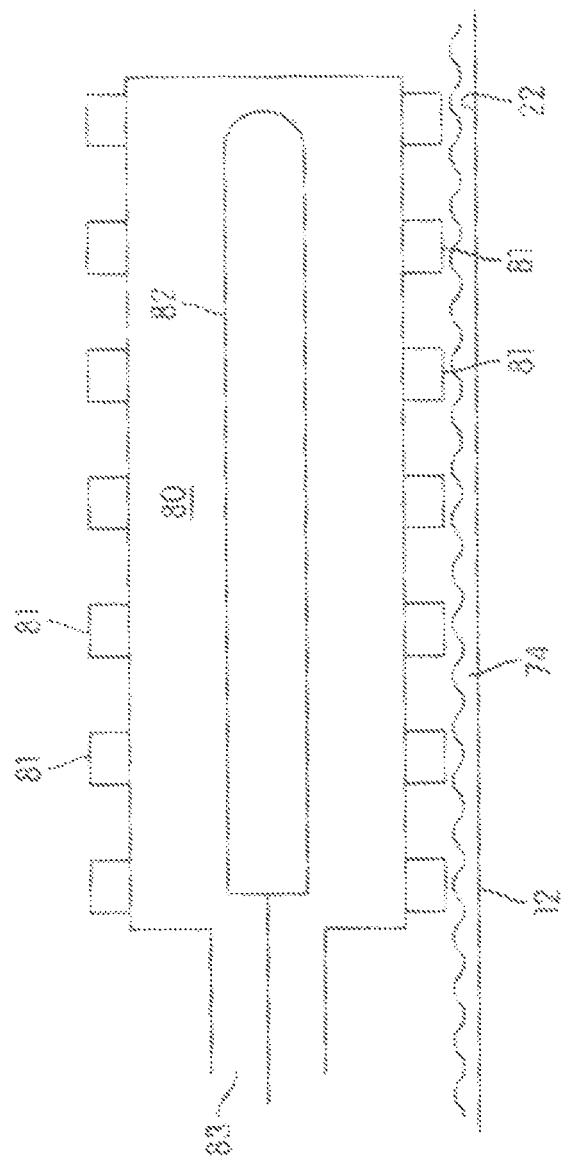

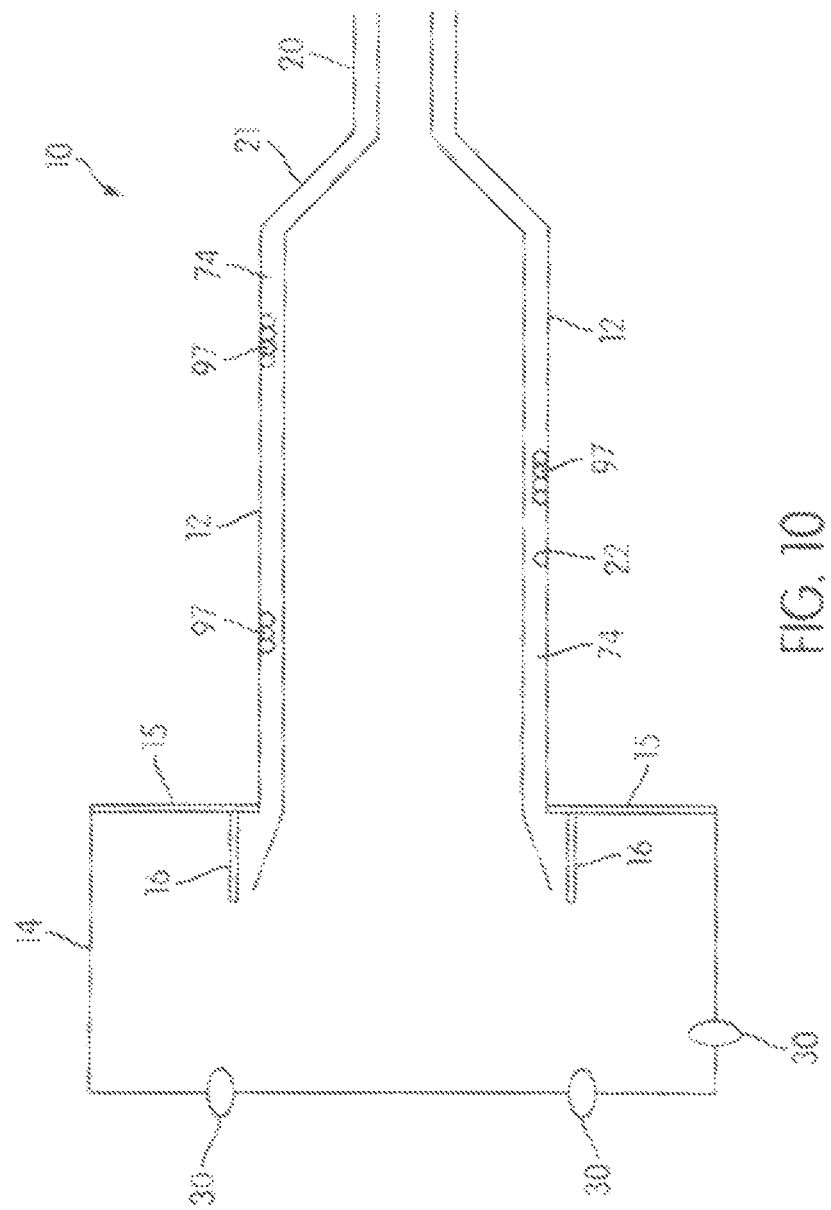

THIN FILM TUBE REACTOR WITH ROTATING RESERVOIR

CROSS-REFERENCE TO RELATED APPLICATIONS

This application is a Divisional Application of Ser. No. 12/001,082, filed on Dec. 7, 2007, now U.S. Pat. No. 7,875,248 issued on Jan. 25, 2011, entitled "Thin Tube Reactor with Rotating Reservoir" by Roshan Jachuck and is hereby incorporated herein by reference. The Ser. No. 12/001,082 application is a non-provisional application of Provisional Application Ser. No. 60/873,445 filed on Dec. 7, 2006 entitled "Thin Tube Reactor with Rotating Reservoir" by Roshan Jachuck and is hereby incorporated herein by reference.

FIELD OF THE INVENTION

This invention relates to chemical reactors and thermal processing equipment.

BACKGROUND

A common problem in chemical reaction processes is how to achieve the proper hydrodynamics in the reactor to efficiently produce the desired products. The reactants need to be mixed so that the molecules of the reaction components come into contact with the other components in the reaction including catalysts. The presence of a gaseous reactant requires the increase of the surface area of the boundary between the gas and the liquid components to increase the efficiency of the reaction. Many processes require fine temperature control or added energy from an electromagnetic field. In some cases rapid temperature changes are desired though difficult to achieve due to the thermal inertia of the reaction components. Also, it is often difficult to ensure proper saturation of the reaction components by an electromagnetic field as the outermost portion of the mixture of reactants tends to be exposed to more radiation than the innermost portion.

Thin film reactors are known to overcome many of these issues however an improved thin film reactor is needed. For example, techniques are known for applying a catalyst to a surface for use as a thin film reactor to thereby provide improved contact with the process components. Such techniques include sol-gel or washcoating, which can be used to adhere a catalytically active coat onto the inner wall of a reactor. However, these coats tend to suffer from attrition and will inevitably deactivate with time. Further, there a number of patents in the art that attempt to address some of the above issues are described below.

U.S. Pat. No. 6,742,774 to Holl discloses a reactor that produces a gas-in-liquid emulsion for providing increased interfacial contact area between the liquid and the gas for-improved-reaction of the gas with the liquid, or more rapid solution or reaction of a gas in or with a liquid. Rotor and stator cylindrical members are mounted for rotation relative to one another and have opposing surfaces spaced to form an annular processing passage. The gap distance between the opposing surfaces and the relative rotation rate of the cylindrical members are such as to form a gas-in-liquid emulsion. Hall is thus directed to a process for mixing a gas and a liquid into an emulsion to increase the contact between the gaseous and liquid components rather than forming a thin film with a large surface area.

U.S. Pat. No. 6,512,131 to Best, et al. discloses a process for carrying out a multi-phase reaction in a continuously operated tube reactor with a liquid phase flowing downwards as a thin film in said tube reactor and components of a continuous gas flowing upward in said tube reactor are brought to material transfer, or reaction respectively. Best uses gas pressure modulation to maintain the thin film and thus does not rotate the tube to provide or maintain the thin film nature of the liquid phase of the reaction. Further, Best does not provide for the separation of multiple products in an integrated separation reservoir.

U.S. Pat. No. 4,675,137 to Umetsu discloses a method for producing a polyacetylene film by introducing acetylene gas into a vessel for storing Ziegler-Natta catalyst to polymerize the acetylene gas with the catalyst. Rotating the vessel coats the side wall with the catalyst. Thus, the acetylene gas introduced into the vessel is polymerized with the catalyst to produce the polyacetylene film. Umetsu's method is not a continuous process and the catalyst is not immobilized.

U.S. Pat. No. 4,353,874 to Keller, et al. discloses a rotary tube reactor, having at least one treatment line composed of tubes with individual sections having gas chambers that are sealed from each other. Each section has a gas outlet and adjacent sections are joined together by material passages. The reactor is used for thermal treatment. Keller relies on multiple tubes to transport reactants within the rotating tube and does not form a thin film on the inner surface of the rotating tube.

U.S. Pat. No. 4,335,079 to Vander Mey discloses an apparatus for a continuous process which comprises introducing a liquid onto a spherical rotating reaction surface as a thin film and rotating the reaction surface at a velocity such that the thin film is continuously moved toward the periphery of the reaction surface. Vander Mey divides the reaction surface into a plurality of areas and deposits within each area a controlled quantity of gas over the liquid film. A sub-atmospheric pressure is maintained while the temperature of the reaction surface is controlled. The reaction product moves to the periphery of the reaction surface by centrifugal action and the reaction product is continuously collected. Vander Mey is directed specifically toward reacting a thin film with a gas. Further, Vander Mey relies on a spherical reaction surface to move the film toward the product collection element and does not discuss the separation of multiple products.

U.S. Pat. No. 4,311,570 to Cowen, et al. discloses chemical processes using thin films of reactants carried out on the surface of a body rotating at high speed. The solid and insoluble liquid products are isolated by using centrifugal force to fling the products from the rim of the body into the surrounding atmosphere. Thus, Cowen relies on products that are solid, such as fibers or powders, or liquids that are incompatible with other products for separation. Further, Cowen requires that-at least part of the reaction surface of the reactor be inclined with respect to the axis of rotation.

Therefore, a reactor or thermal processor that utilizes a rotating tube to create a thin film of process components for a continuous reaction is desired. Further, a reactor or thermal processor that utilizes an improved separation means is desired.

SUMMARY OF THE INVENTION

The present invention provides for a method and apparatus directed to a tube reactor having a substantially tubular body portion that includes a conical section, an entry port, an opposing exit port, and an axis extending between the ports through the body portion. The tubular body portion can rotate about the axis. The conical section can be positioned within the tubular body portion near the entry port. At least one reactant can be fed into the tubular body portion, and directed toward the conical section. An inner surface of the tubular body portion receives the reactants from the conical section, and processes the reactants while the tubular body portion is rotating. An insert may be positioned within the tubular body portion to further process the reactants along the inner surface of the tubular body portion. Heating and cooling elements can surround the tubular body portion to control the temperature in the tubular body portion. A rotating reservoir having a top plate and a damper can be coupled to the rotating tubular body portion. The damper receives the processed reactants from the inner surface of the tubular body portion, and guides the processed reactants into the rotating reservoir to minimize turbulence. The rotating reservoir then separates the processed reactants by density. The reservoir includes at least one outlet port for controlling the output of the processed and separated reactants from the reservoir.

BRIEF DESCRIPTION OF THE DRAWINGS

FIG. 1 illustrates a tube reactor of the present invention;

FIG. 8 illustrates an insert having a radiation source for use with the tube reactor;

FIG. 10 illustrates a tube reactor having multiple beads for use with the present invention.

DESCRIPTION OF SPECIFIC EMBODIMENTS

Figure 1A:
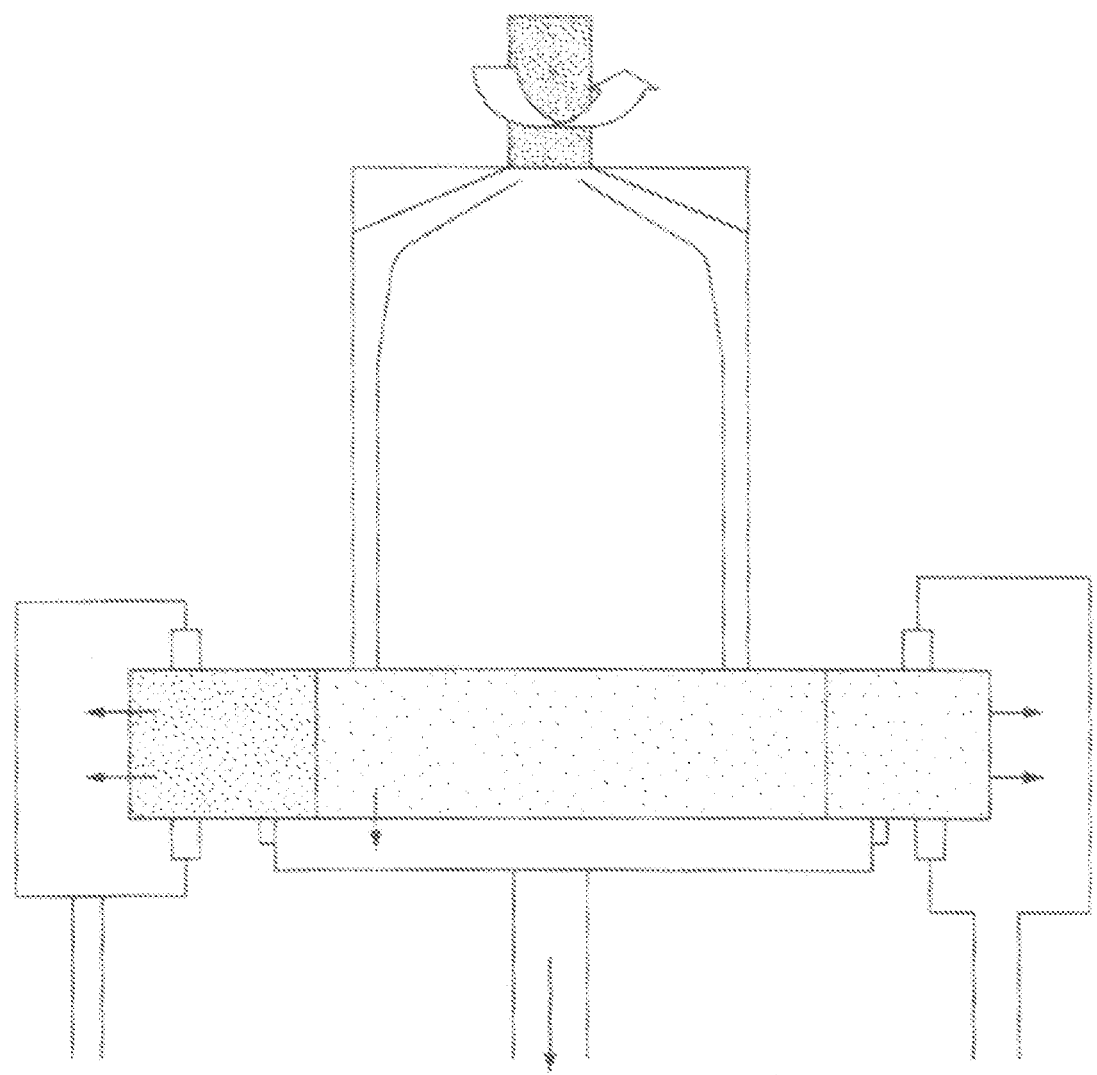
FIG. 1A illustrates a tube reactor in accordance with another embodiment of the present invention.

Referring to FIGS. 1 and 1A, there is shown the thin film tube reactor of the present invention. The tube reactor 10 includes a primary tube 12 having a substantially tubular body portion that can rotate about an axis extending from one end of the tubular body to an opposite end, so as to generate a centrifugal force. The tube reactor 10 also includes a conical section 21 positioned in the primary tube 12, and a separation reservoir 14 capable of rotating. In some embodiments described below, the tube reactor can also include a variety of components, such as, inserts that can be utilized to provide the tube reactor 10 with additional processing options. The tube reactor 10 can be utilized to provide enhanced control in a particular reaction, and to extend the residence time for the reaction. The tube reactor 10 can also be adapted to perform interfacial chemistry. Specifically, interaction between fluids with different densities.

The primary tube 12, which is rotatable about the axis, includes a feed tube 20 configured for depositing process components or reactants, such as, fluids and gases, onto an inner surface 22 of the primary tube 12. Alternatively, multiple feed tubes can be included at various points along the primary tube 12, to provide sequential addition of fluid. For example, when precipitating particles and subsequently coating them to prevent agglomeration, or to add functional properties to the particles. In an embodiment, the feed tube 20 can be coupled to a device capable of generating ultrasonic vibration to permit fluid to be exposed to the ultrasonic vibration prior to introduction into the primary tube 12. The feed tube 20 in conjunction with the centrifugal force generated by the rotating primary tube 12, directs the reactants toward a conical section 21 that can be affixed to the inner surface 22 of the primary tube 12. The conical section 21 can have a slope sufficiently steep to facilitate propagation of the reactants. The slope of the conical section 21 can also be altered based on the viscosity and type of reactants being introduced. The conical section 21 generates turbulence in the reactant flow upon contact that enhances mixing of the reactants, and facilitates the axial flow of the reactants onto the inner surface 22 of the primary tube 12. The surface of the conical section 21 can also be profiled to include structures to further increase turbulence in the reactant flow, and improve the hydrodynamics of the thin film on the surface. For example, the surface of the conical section 21 can be grooved or sandblasted.

The primary tube 12 can be rotated by a motor, which, in one embodiment, can be coupled to a drive wheel 25 by a timing belt. Alternatively, the drive wheel 25, shown in FIG. 2A, can be driven by gears in communication with the motor or the primary tube 12 can be connected to the drive shaft directly. The interface between the feed tube 20 and the primary tube 12 may be a clearance fit or a sealed bearing to allow the primary tube 12 to rotate while the feed tube 20 does not.

The reactants can be fed to the feed tube 20 by a method suited to the properties of the reactants. For example, a screw feed hopper may be used to deliver certain solids and liquids. A pneumatic delivery system may be used to deliver certain solids. Fluids may be delivered by a pump system.

Generally, the separation reservoir 14 may be in fluid communication with the primary tube 12; however, the separation reservoir 14 can be connected to the primary tube 12 through a coupling that allows the separation reservoir 14 to rotate at a different rate and direction than primary tube 12. The reservoir 14 collects, rotates, and holds the processed reactants to extend the residence time of the reactants, in order to separate the process products based on different densities of the reactants.

The reservoir 14 includes an inner wall 26 and an end plate 28. The end plate 28 can include two or more radially spaced outlets 30. Spaced outlets 30 can also be positioned at various points on the reservoir 14. Each of the outlets 30 are positioned and sized such that the stream that exits through a particular outlet has a particular concentration of one component of the fluids and/or solids in the separation reservoir 14. An outlet 30 can also be configured to serve as an external return for relatively dense fluid from the reservoir 14 to the primary tube 12. The separation reservoir 14 can also be temperature controlled by including a cooling or heating jacket on the exterior of the reservoir 14.

The separation reservoir 14 also includes a top-plate 15 that can be coupled to the tube 12, and a damper that can be affixed to the top-plate 15. In an embodiment, the top-plate 15 can be stationary, while the reservoir 14 can rotate in the same or opposite direction of the rotation of tube 12. Similarly, the reservoir 14 can rotate at the same or different speed (revolutions per minute (RPM)) than that of tube 12. In an embodiment, the damper 16 can be circular in shape, and can be perpendicularly affixed to the top-plate 15. Therefore, when the top-plate 15 is configured to be stationary, so is the damper 16. The damper 16 can be affixed to the top-plate 15 at a location substantially wider than the width of tube 12, so as to provide an intermediate surface between the tube 12, and the endplate 28 of reservoir 14 for contacting, and directing incoming processed reactants into the reservoir 14. Specifically, the damper 16 receives the processed reactants from the inner surface 22 of tube 12, and guides the processed reactants into the rotating reservoir 14 to minimize turbulence. Oftentimes, certain solids present in the processed reactants tend to contact the reservoir inner wall 26, and may not readily migrate to the endplate 28 at the bottom of the reservoir 14. In such situations, damper 16 can be utilized to direct the solids and other processed reactants towards the endplate 28 in reservoir 14.

In other embodiments, the top-plate 15 with affixed damper 16 can rotate. The direction and speed of rotation of top-plate 15 can be variable, and does not need to correlate with the direction and speed of the tube 12 or reservoir 14.

Figure 2A:
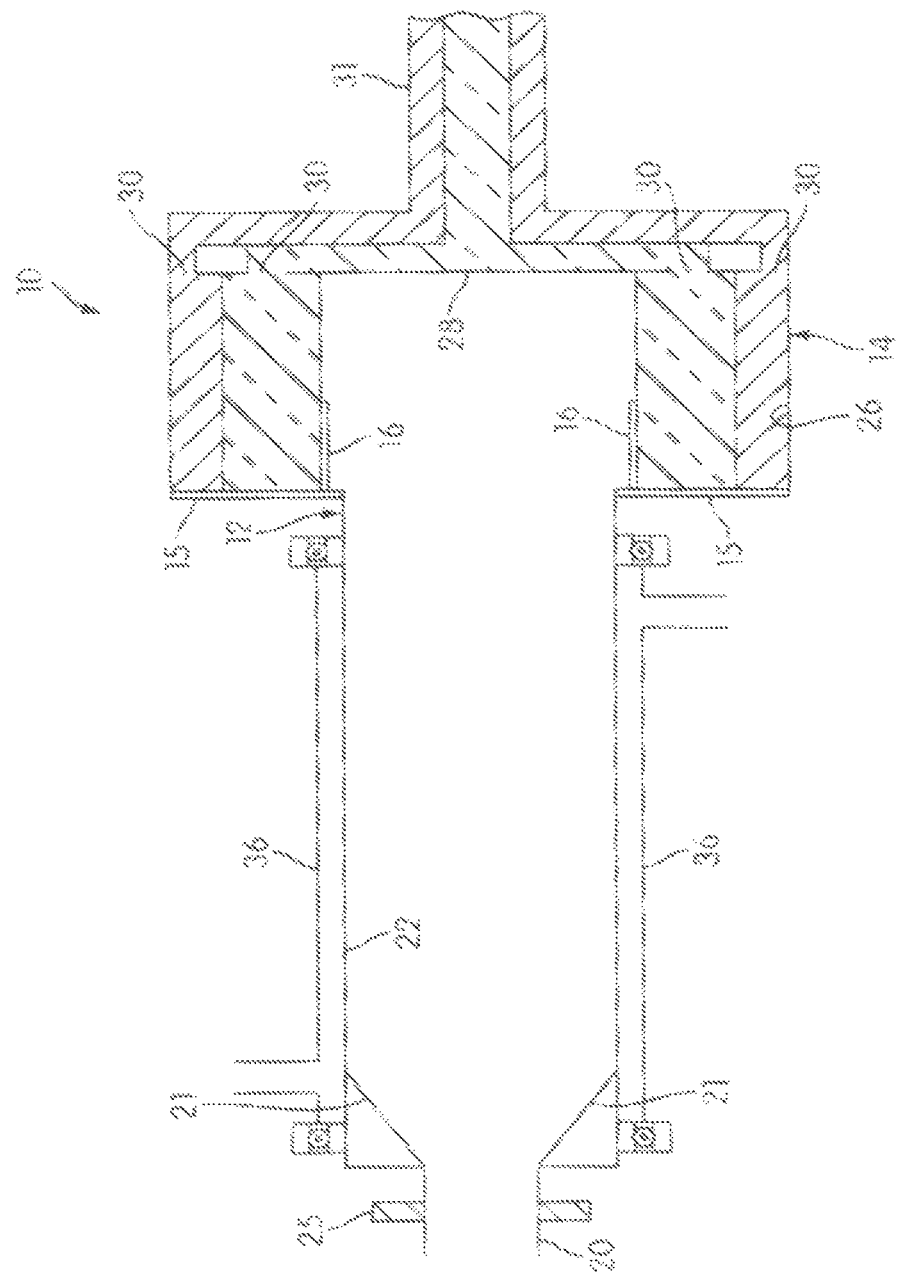
FIG. 2A illustrates the tube reactor of FIG. 1 having output passages and a drive wheel.

FIG. 2A shows a plurality of outlet passages 31 in fluid communication with the outlets 30. In a particular embodiment shown in FIG. 2B, weirs 29 can be used to control output of the reaction products. Alternatively, a weir 29 may be used in conjunction with the end plate 28. It should be appreciated that outlet passages 31 can also be provided on top-plate 15 of reservoir 14.

In a particular embodiment of the invention, a crossflow filtration membrane can be incorporated into the reservoir inner wall 26. The membrane filter can be configured to remove a particular mixture component in the separation reservoir. For example, the membrane filter may be hydrophilic, hydrophobic, or size selective to remove such components as water, oils, or certain particulates. Further, a dead-end filtration membrane may be incorporated into the channels 31 connected to the outlets 30.

Alternative filtration methods that may be incorporated into the tube reactor 10 include ultrafiltration, reverse osmosis, and nanofiltration. In ultrafiltration, a composite membrane can be spiral-wound about a central axis and the feed can be axially driven through the resultant ultrafiltration cylinder. The composite membrane used in ultrafiltration may be configured to retain such contaminants as solids, colloids, and large organic molecules. Reverse osmosis can be a particularly fine filtration method that uses a semi-permeable membrane in a crossflow configuration to remove contaminants from fluids such as water, ethanol, and glycol. Reverse osmosis requires a pressure differential across the membrane. Nanofiltration is a reverse osmosis technique that uses a less discriminating membrane that allows certain ions such as Na+, K+, and Cl− to pass.

Figure 3:
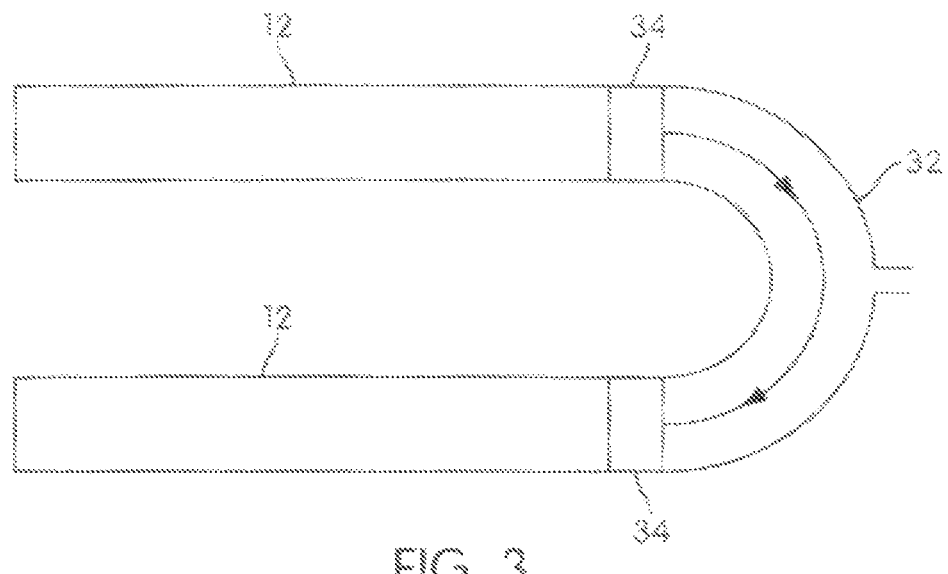
FIG. 3 illustrates multiple tube reactors connected in series.

A plurality of primary tubes 12 may be connected in series as shown in FIG. 3. A reaction process may require that the primary tubes 12 each have different-diameters and axial velocities. Such a configuration permits the primary tubes 12 to provide enhanced control over a reaction, and extend the residence time for the reaction. The plurality of primary tubes 12 may be driven by a single drive system that can be geared to drive each primary tube 12 at the axial velocity required by the reaction process. The primary tubes 12 can be connected by non-rotating connecting pipes 32, each of which may connect two or more tube reactors 10. The connecting pipes 32 can be coupled to the primary tubes 12 by a rotating to non-rotating union 34 that comprises a bushing or a bearing. Alternatively, a connecting pipe 32 can be coupled to a primary tube 12 using a simple bearing with a seal. The connecting pipes 32 allow the introduction of additional components to the reaction process between tube reactors 10, as well as the removal of products and waste such as by the use of a separation reservoir 14. The advantage of using multiple tube reactors 10 may be that the parameters of each tube reactor 10 may be configured so that the system of reactors achieves the required hydrodynamic regime as well as multiple process stages according to the process requirements.

Figure 2B:
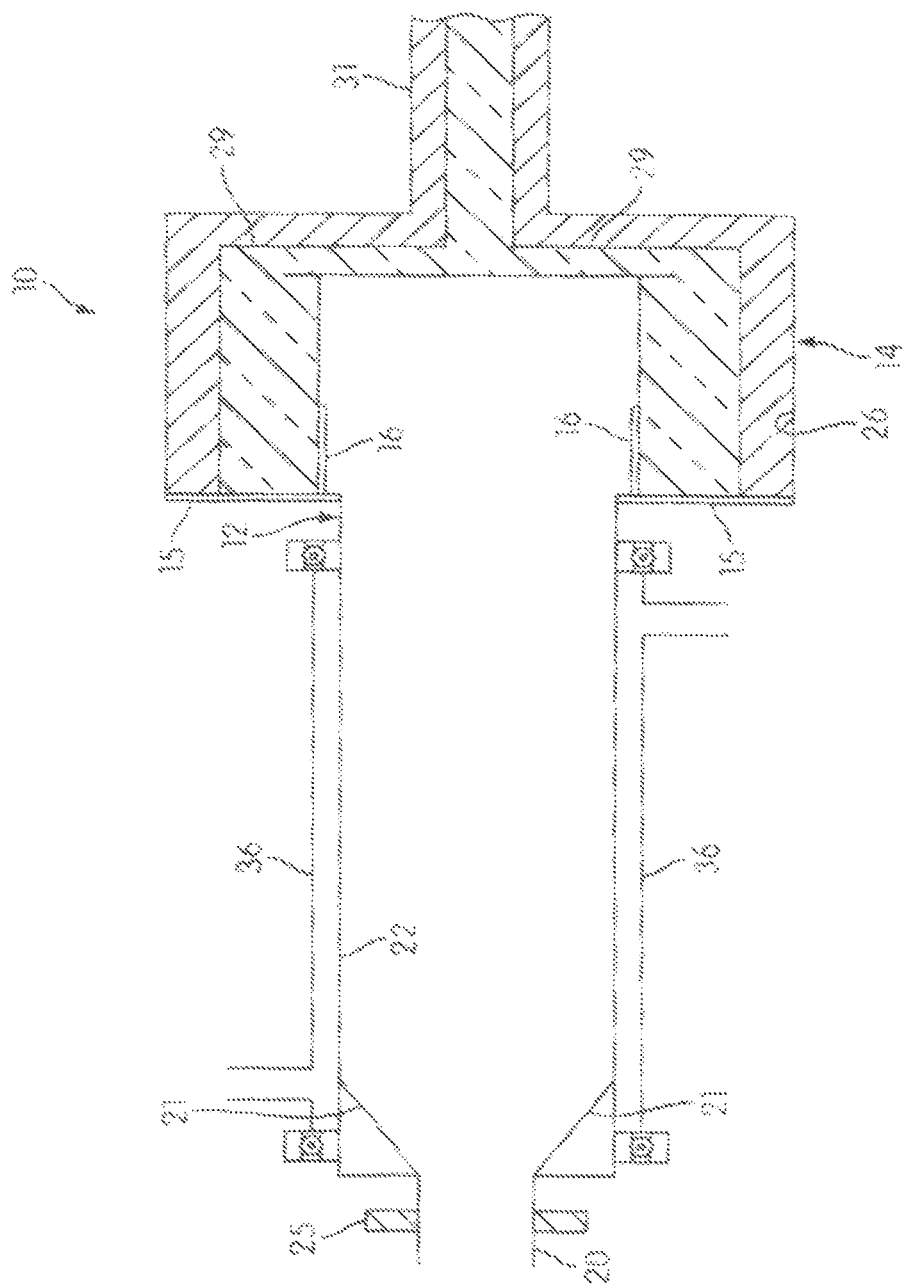
FIG. 2B illustrates the tube reactor of FIG. 2A having a weir configuration.
Figure 4:
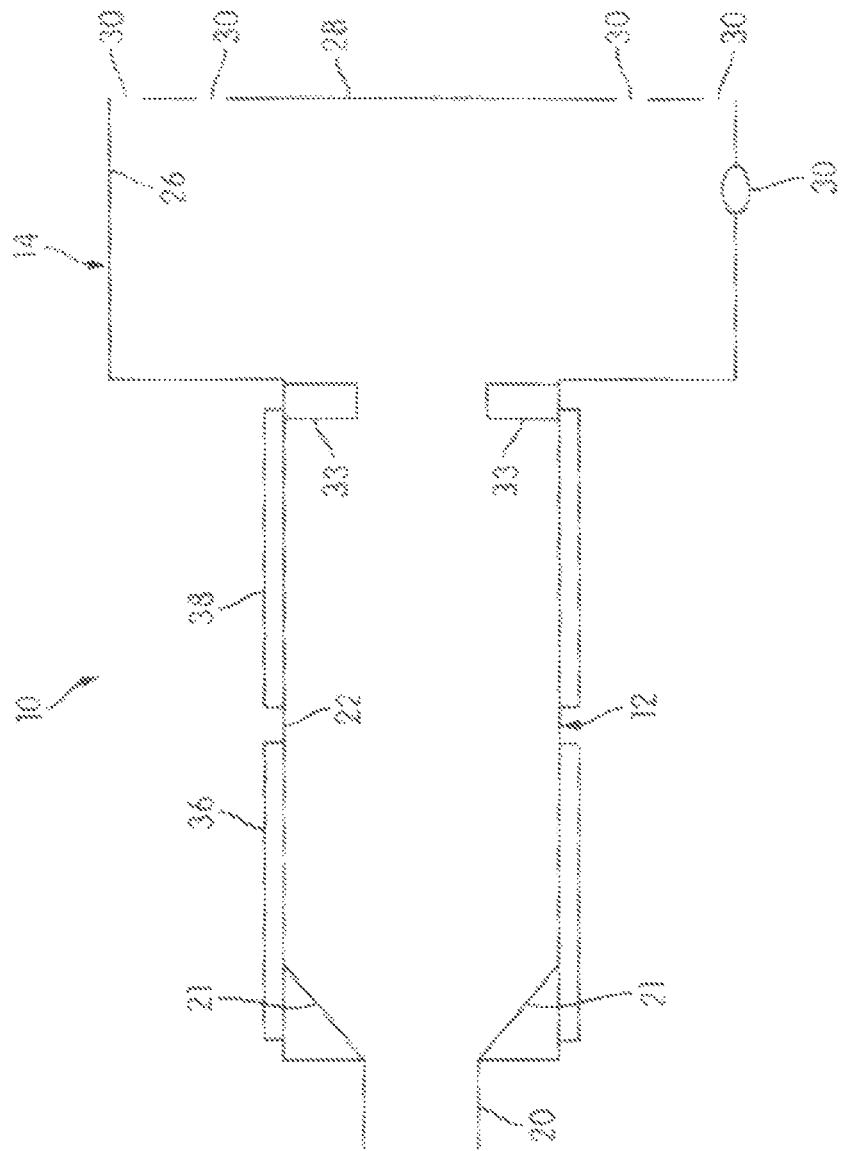
FIG. 4 illustrates the tube reactor of FIG. 1 having heating and cooling elements.

In a particular embodiment shown in FIGS. 2A, 2B, and 4, one or more heating jackets 36 and cooling jackets 38 can be applied to the primary tube 12 for controlling the reaction temperature. Further, since the fluids in the primary tube 12 form a thin film on the inner surface 22, the fluids have a low thermal inertia. Thus the fluids in the primary tube 12 may be rapidly heated and cooled by heating jackets 36 and cooling jackets 38. Therefore, the tube reactor 10 can be well suited for thermal processing and separation of components with or without a chemical reaction. The heating jackets 36 may comprise inductive, resistive, or conductive heat transfer elements. Alternatively, a heat transfer fluid can be used. The heating jackets 36 and cooling jackets 38 may incorporate special heating structures to improve the thermal performance. Further, the inner surface 22 may incorporate structures that break down the boundary layer in the thin film to thereby increase the performance of the heat transfer. More particularly, surface roughness on the inner surface 22 causes more turbulent flow in the thin film. Thus, there can be greater mixing of the thin film and the thermal boundary layer may be reduced. A small thermal boundary layer indicates a small thermal gradient and improved heat transfer performance.

Further to modifying the inner surface 22, the outer surface of the primary tube 12 may be affected to improve the heat transfer between the wall and a heat transfer fluid. For example, surface effects such as fins may be included to increase the surface area of the outer surface. Also, the surface roughness of the outer surface may be configured to reduce the boundary layer of the heat transfer fluid to increase heat transfer.

In an embodiment, as shown in FIG. 4, primary tube 12 can include a retaining wall 33 that can be positioned circumferentially about the inner surface 22, of the primary tube 12 to permit thin film batch reactions. For example, the retaining wall 33 can retain ionic fluid along the inner surface 22 of the tube 12, white allowing a less dense fluid to flow on top of the ionic fluid, and over the retaining wall 33 into the reservoir 14.

Figure 5:
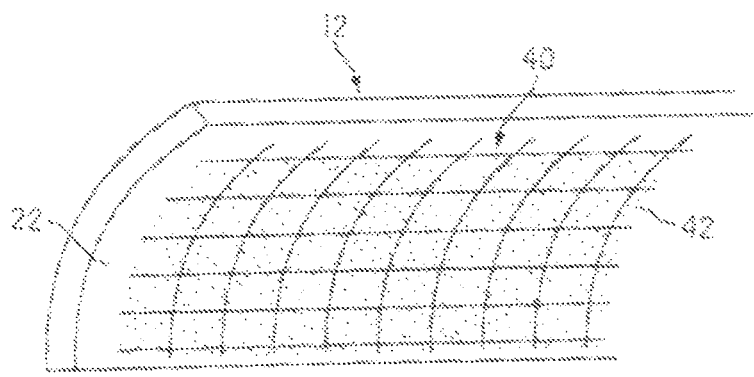
FIG. 5 is a sectional view of the tube reactor with a structured surface for immobilizing a catalyst element.

It may often be desirable to use a catalyst to initiate or speed up a reaction process. As shown in FIG. 5, a slurry of catalytically active solid particles 40 can be immobilized on the inner surface 22 through the use of a structured surface 42 such as a mesh. The structured surface 42 can be bonded or machined onto the inner surface 22 with substantially no passages between compartments in the mesh 42. The catalyst slurry 40 can be passed through a non-rotating or a slowly rotating reactor until the catalyst slurry 40 has wetted the entire mesh 42. At this point, the rotational rate can be increased to the reaction process velocity. The centrifugal force acts to hold the particulates in the catalyst slurry 40 in the pores of the mesh 42. The process fluid readily flows over the mesh 42 and contacts the catalyst slurry 40. The bed activity can be maintained by adding small amounts of catalyst slurry 40 to the feed 20. The entire catalyst slurry 40 can be replaced by slowing the rotation of the tube reactor 10 and flushing the spent catalyst slurry 40 with a fluid. The new catalyst slurry 40 can then be administered as described above. Alternatively, a catalyst that does not require frequent replacement can be simply affixed to the inner surface 22.

Many processes require an external energy input such as electromagnetic radiation to promote the reactants to a state where reaction can take place. The tube reactor 10 may be particularly well suited to exploit these field effects due to the hydrodynamics and scale of the film thickness. The film can be sufficiently thin that almost complete saturation will occur. This ensures that all the reaction components will be exposed to substantially the same level of irradiation, which ensures good product uniformity and can be used to promote selectivity. As the tube reactor 10 is rotating it may not be essential to illuminate the entire wall. By controlling the rotational rate, it may be possible to ensure that the fluid passes through the zone of illumination as many times as may be required by the process. Further, since the tube reactor 10 is hollow, the radiation source may be within the tube reactor 10 to thereby irradiate the thin film from inside the tube. This has the benefit of increased flexibility in the tube materials since the tube may not be required to be transparent to the radiation.

As illustrated in FIGS. 6 through 10, the tube reactor 10 can include various additional components, such as, inserts that provide the tube reactor 10 with additional processing options. For example, the inserts can be utilized as condensers, enhanced heating or cooling elements, to provide enhanced support for catalysts, and as a source of UV, laser, microwave radiation, and magnetic and electrical fields. The various inserts can also be utilized as turbulence promoters for gas-solid and gas-liquid reactions. The inserts can also be used to introduce or remove reactants to and from the tube reactor 10. In addition, the various inserts can have a profiled surface to enhance interaction among the reactants and process components.

Figure 6:
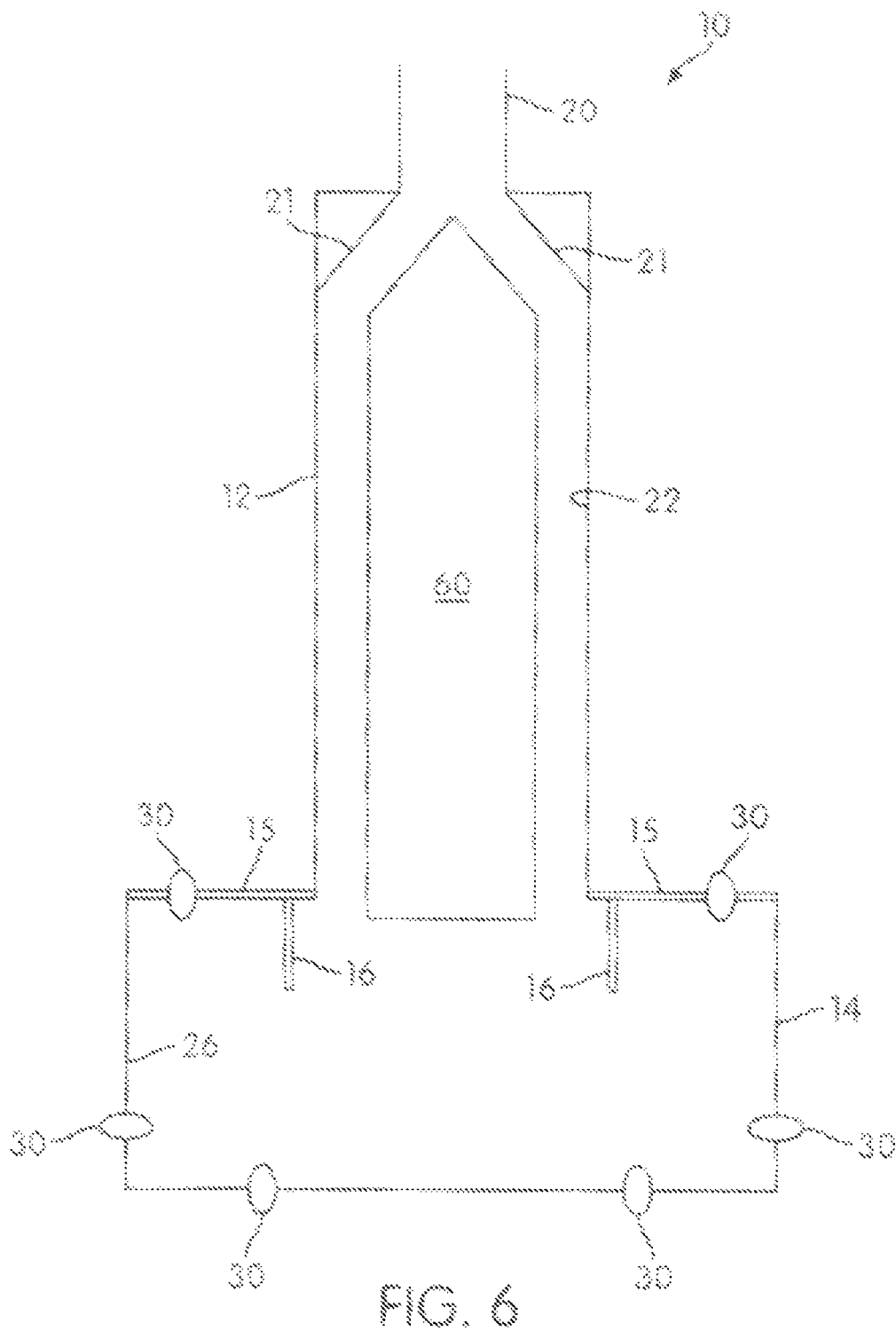
FIG. 6 illustrates a hollow insert for use with the tube reactor of the present invention.

Specifically, FIG. 6 illustrates a tube reactor 10 having a hollow insert 60 that may or may not rotate, and that can be utilized as a turbulence provider. Insert 60 is depicted in FIG. 6 having a conical top end, however in other embodiments, the top end of insert 60 can be flat. The insert 60 creates turbulence by deflecting and channeling the introduced process components (reactants) toward the conical section 21, and along the inner surface 22 of primary tube 12. The insert 60 increases the interaction between fluids, and redirects gases towards the fluids along the inner surface 22. The entire surface of insert 60 can be profiled to have, for instance, bumps, grooves, or sandblasted surface, in order to further enhance the gas/liquid interaction. The insert 60 can be heated or cooled to keep the reactants (fluids and gases) at a desired temperature. In addition, the entire primary tube 12 can include a jacket 36 to further heat or cool the reactants.

Figure 7:
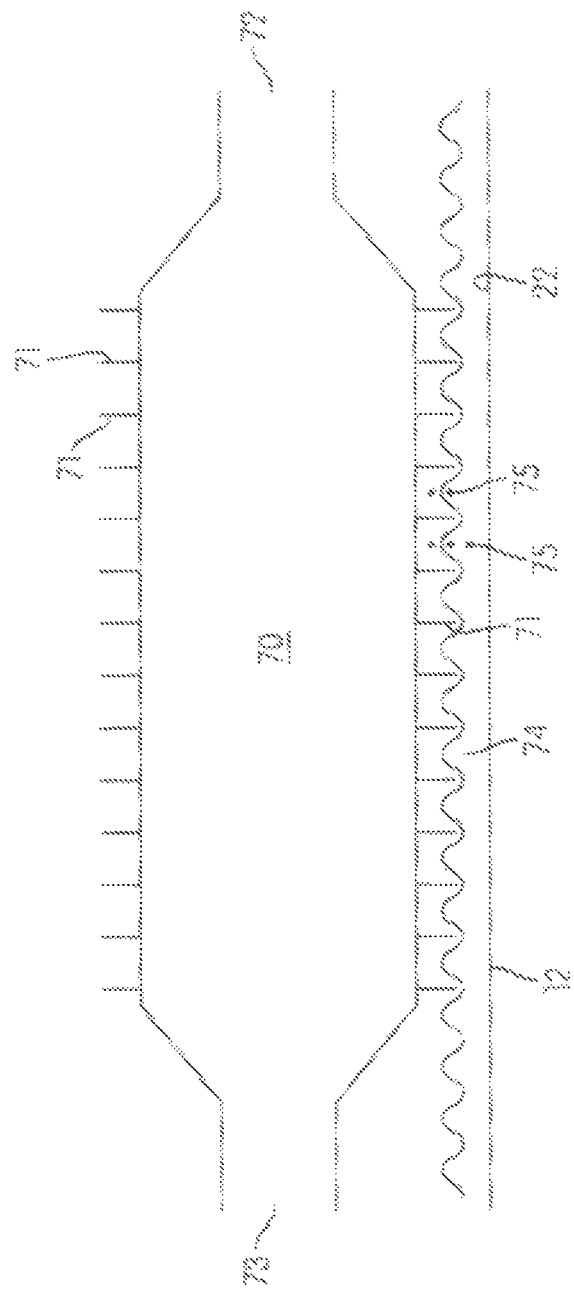
FIG. 7 illustrates an insert having multiple fins for use with the tube reactor.

In another embodiment illustrated in FIG. 7, insert 70 can include thermally conductive fibrous fins 71 that create turbulence in the fluid flow 74. The insert 70 and fins 71 can be heated or cooled to effect the desired reaction in the fluid flow 74 along the inner surface 22. The fins 71 can be made of Nobel metals for catalytic purposes. The fins 71 can also be made of carbon nanotubes and may be coated with a catalyst. If coated with a catalyst, the fins 71 can enhance the catalytic reaction to permit heterogeneous catalysis for a wider range of reactions including biodiesel, hydrogenation, oxidation, etc.

In an embodiment, the insert 70 can be configured to have an input port 72 on one end and an output port 73 at the other end of the insert 70. A hot or cold fluid can be passed into the input port 72, and expelled from the output port 73 to control the temperature of the insert 70 and the fins 71. The fins 71 can transfer heat from the insert 70 to the fluid flow 74 along the inner surface 22. When used as a cooling condenser the fins 71 cool the fluid flow 74 by facilitating the transfer of heat from the fluid to the insert 70.

The insert 70 is typically utilized in a horizontal position, but can also be used in a vertical position depending on the application. The insert 70 can remain static within the rotating primary tube 12. Alternatively, the insert 70 can rotate in the same direction as that of the primary tube 12, or it can rotate in the opposite direction. If the insert 70 rotates along with the tube 12, the fluid 74 contacting each fin 71 will not be disturbed as much as if the insert 70 were stationary, or rotating in the opposite direction from that of tube 12. The increased turbulence created by the presence of the fins 71 in the reactant fluid 74 facilitates the transfer of heat to and from the fluid flow 74. The fluid flow 74 profile can also be manipulated by using the appropriate fin design and spacing.

Figure 7A:
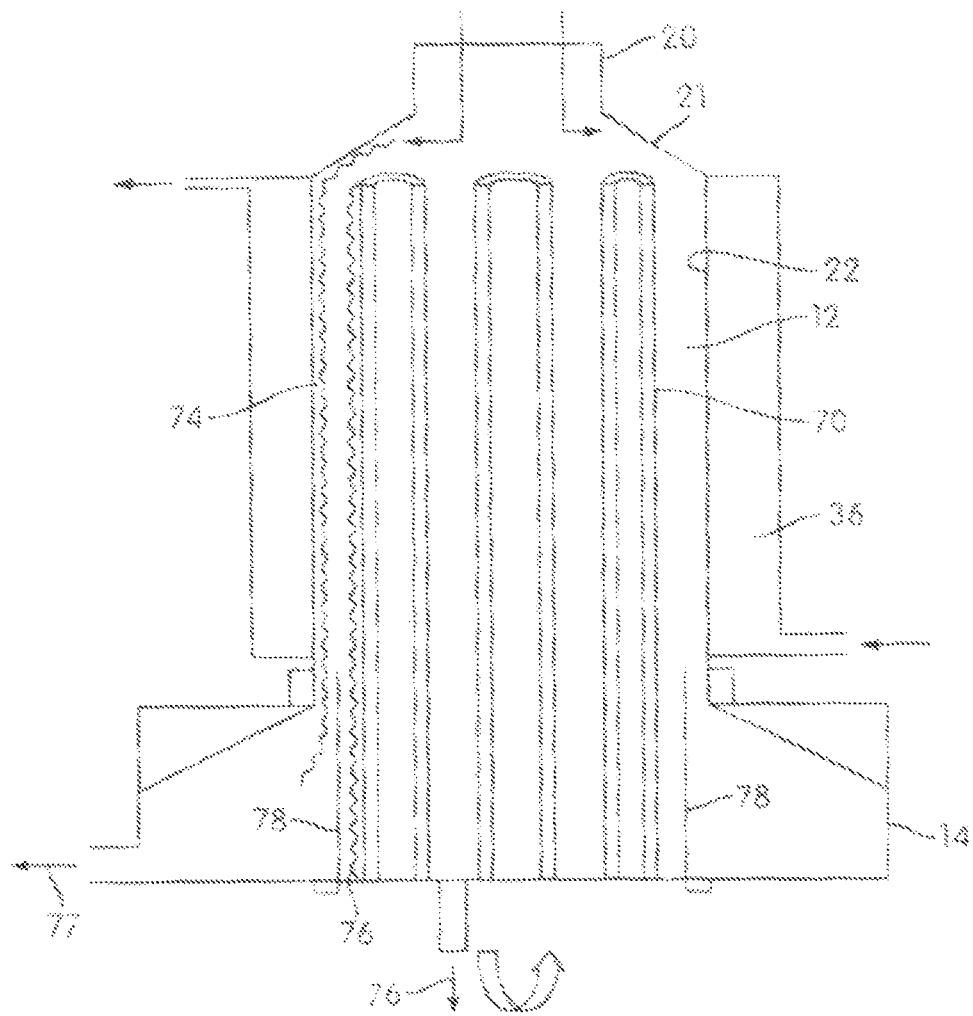
FIG. 7A illustrates an insert configured as a condenser for use with the tube reactor of the present invention.

In a condensation application, insert 70 can be cooled by having a cold fluid transported from input port 72 through insert 70 and out the output port 73, while the primary tube 12 is heated by a heating element or heating jacket 36. Condensation 75 that builds up on the insert 70 drips off, and falls back into the fluid flow 74 along the inner surface 22. This configuration can be useful in a biodiesel application. In an alternative embodiment, illustrated in FIG. 7A, insert 70 can be a condenser that extends from within the reservoir 14 and into the primary tube 12. When the primary tube 12 is rotating about a vertical axis, the condensate 76 that builds up on the insert 70 can continuously flow along the condenser insert 70, and drain into the reservoir 14 for collection. In such an embodiment, the reservoir 14 may be designed specifically to remove such condensate 76. For example, the reservoir 14 can include a separating barrier 78 that partitions the product 77 from the condensate 76 in the reservoir 14. This embodiment can act as an energy efficient distillation process where evaporation and condensation may be performed across a relatively small distance between the inner surface 22 of the primary tube 12, and the surface of the condenser insert 70. This can create a substantially large driving force to perform a phase transfer process, as illustrated in FIG. 7A.

In another embodiment, illustrated in FIG. 8, insert 80 can include a UV, microwave, or laser to heat or process the fluid flow 74 in primary tube 12. For example, the insert 80 can include multiple perforations 81 on its surface to allow heat from an internally housed UV lamp 82 to treat fluid along the inner surface 22 at specific points, while the primary tube 12 is rotating. Depending on the UV exposure desired, the spacing of the perforations 81, and the opening diameter of each perforation 81 can be appropriately selected. The UV lamp 82 or laser can be pulsed during the reaction, or can be operated continuously in steady state. In other embodiments, just the UV lamp 82 can be introduced into the primary tube 12 directly without the insert 80 serving as a housing. In still other embodiments, the insert 80 can include bumps or other structures on its surface instead of perforations, and the UV lamp 82 in insert 80 can be replaced with a magnetron to radiate the fluid along the inner surface 22. Also, depending on the application, a coolant, such as $N_2$, can be introduced into insert 80 through port 83, and directed through perforations 81 to interact with the fluid flow 74. In addition, a cooling jacket 36 can be affixed to primary tube 12 to remove heat from the fluid flow 74 to facilitate a continuous reaction at a controlled temperature.

Figure 9:
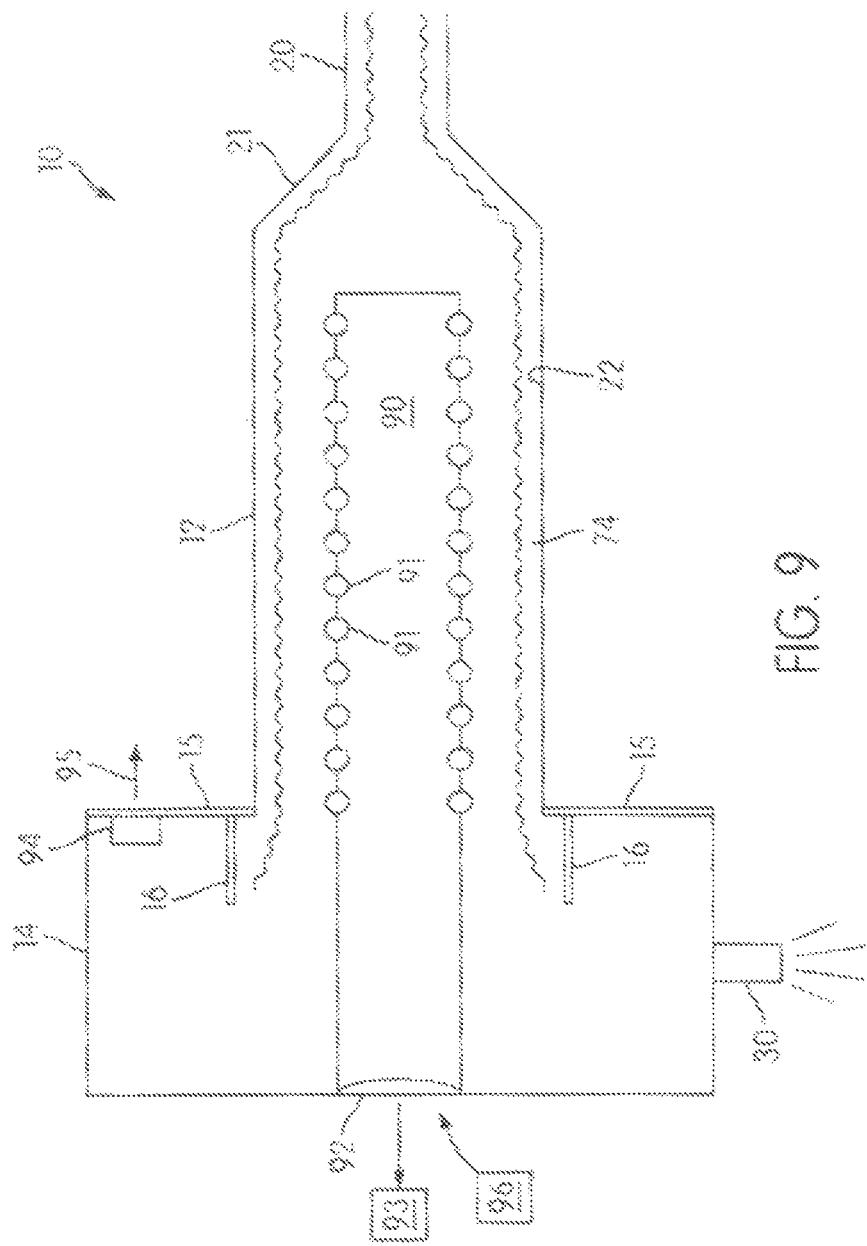
FIG. 9 illustrates a tube reactor having an insert with perforations for removing vapors and introducing gas into the tube reactor.

In another embodiment, illustrated in FIG. 9, the insert 90 can include multiple perforations 91, a port 92, and can be utilized for vapor removal or gas introduction. Specifically, a vacuum 93 can be attached to port 92 to extract vapors from inside the tube reactor 10, by pulling the vapors through the perforations 91, and out the port 92 away from the fluid flow 74. Alternatively, a gas source 96 can be attached to port 92 to introduce a gas into insert 90, and through perforations 91 to treat the fluid flow 74. In one embodiment, air can be forced into port 92 and through perforations 91 to force products of the reaction, such as ethanol, through exit ports 94.

In an embodiment, illustrated in FIG. 10, beads 97, such as glass beads, can be affixed to the inner surface 22 of primary tube 12. Alternatively, the beads 97 can be free-flowing within the primary tube 12, and upon the generation of a centrifugal force due to the rotation of primary tube 12, the beads 97 would be suspended in place against the inner surface 22 of primary tube 12. As shown in FIG. 10, whether affixed or adhered to the inner surface 22, the beads 97 can be completely immersed in the fluid flow 74. Each bead 97 can be coated with a catalyst to react with the fluid flow 74. By coating each bead 97 with a different catalyst, multiple reactions can occur at the same time, thereby alleviating the need to process the fluid flow 74 multiple times with a different catalyst each time in order to achieve the desired reaction.

The wall of the tube reactor 10 may be replaced entirely or in parts with transparent sections. This, allows indirect and non invasive techniques to collect valuable data regarding the process conditions and degree of reaction. Such examples of these techniques include Raman spectroscopy and IR thermometry. The transparent sections may also be used to expose the fluid to sources of electromagnetic field radiation as described above.

The tube reactor 10 can be particularly accommodating to a gaseous process component such as a catalyst or a reactant. The large surface area of the thin film provides excellent contact between the gas and the film. For example, a gaseous process component may be added to remove a particularly volatile component of the film in the form of a gas. Further, a vacuum device may be used to enhance the ability of the tube reactor 10 to remove unwanted components that will exit the thin film in the form of a gas when under negative pressure. Normally, the gasses can be introduced or the vacuum can be applied using a coaxial passage, however, other methods may be imagined by one skilled in the art. For example, a stationary manifold having a sealing engagement with a perforated portion of the primary tube 12 while allowing the primary tube 12 to rotate may be used to apply a vacuum or introduce a gas to the reactor 10. Alternatively, a rotating to non-rotating union 34 in communication with the primary tube 12 and/or the separation reservoir 14 may act as a manifold for applying a vacuum or introducing a gas.

In use, the process components can be fed into the tube reactor 10 through the feed tubes 20. The process components can be directed toward the conical section 21, which directs the process components towards the inner surface 22 as shown in FIG. 1. The primary tube rotates at a particular velocity to form a thin film of the components on the inner surface 22. A particular insert can also be utilized to further process the thin film of components on the inner surface 22. Further, shear stresses due to slippage between the inner surface 22 and the film enhance the mixing of the process components. As the process components are added to the inner surface 22 and the centrifugal force forms them into a thin film, previously added process components can be forced out from under the newer components in the only direction available which may be along the inner surface 22 toward the separation reservoir 14. As the components traverse the primary tube 12 they react with each other and any gas that may be present to result in the process products. Further, temperature control can be affected by heating jackets 36 and cooling jackets 38 and any electromagnetic radiation required by the process can be added to the thin film through the wall of the primary tube 12.

The products of the reaction process, and any remaining process components, build up in the separation reservoir 14, and the centrifugal force causes components of the separation mixture to separate based on their respective densities. More particularly, the higher the density of a mixture component, the closer to the reservoir inner wall 26 that component resides in the separation reservoir 14. Since the composition of the separation mixture may be known, the outlets 30 can be radially spaced on the end plate 28 such that it is known which component exits through which outlet. In this manner waste products can be separated from the useful products.

In the case that multiple tube reactors 10 are connected in series, the products of a first tube reactor enter the non-rotating connecting pipe 32 through the union 34. While products may be added and removed along the primary tube 12, the connection pipe 32 can be convenient for products to be removed or additional reaction components to be introduced to the system. Subsequently, the components pass into a second tube reactor through another union 34 for the next stage of the process.

A more specific use of the invention can be a heat treatment process for pasteurization. The pasteurization process requires that a volume of fluid can be heated to a temperature and held for sufficient time that bacterial organisms can be killed. Heating to a higher temperature reduces the time but can lead to protein denaturing. For example, milk pasteurization requires that the milk be maintained at a temperature of about 63 degrees C. for at least about 30 minutes, 72 degrees C. for at least about 16 seconds, or 138 degrees C. for at least about 2 seconds. The primary tube 12 can be surrounded by the heating jacket 36 and then the cooling jacket 38. The fluid, such as milk, can be input to the rotating primary tube 12 through feed tube 20 and forms a thin film on the inner surface 22. The heating jacket 36 rapidly heats the thin film to the required temperature. A particular embodiment of the invention can be capable of generating heat transfer coefficients over 8000 Watts per square meter per degrees Kelvin. The thin film can then be rapidly cooled by the cooling jacket 38 to prevent product denaturing. The fluid then enters the separation reservoir 14 where high fat content milk (cream) can be separated from lower fat content milk (skimmed).

A further specific use of the invention can be a method of ink jet toner preparation. In such a method, a polymer can be dissolved in a volatile organic solvent to form an aqueous emulsion. Chemical additives can be added and the emulsion can be fed into the primary tube 12 through feed tube 20. A vacuum can be applied to the reactor 10 as described above, and a heating jacket 36 can be included as shown in FIG. 2A. The organic phase can then be removed from the aqueous phase and the emulsions become a suspension. The suspension flows into the separator section 14 where the solid phase tends towards the reservoir inner wall 26 and the aqueous phase more inner-wards. Damper 16 or a slight outward taper of the separation reservoir 14, aids in the flow of the solids towards the end plate 28. The high solids phase can be drawn out through the outlets 30 using a suitable pumping device such as a diaphragm pump.

A further specific use of the invention can be a particular chemical reaction. In such chemical reaction, alkali can be dissolved in a low order alcohol, and the stream can be fed into the primary tube 12 through feed tube 20 as shown in FIG. 1. A stream of triglyceride can also be fed into the primary tube 12 through feed tube 20. The rotation of the primary tube 12 acts to mix the streams and initiate reaction. The inner surface 22 of the primary tube 12 can be heated by heating jacket 36 to further heat the reactants thereby increasing the reaction rate. The stream enters the separation reservoir 14 where a stream containing fatty acid derived methyl ester tends innermost, exiting the reactor 10 through the innermost outlets 30. The second product stream, exiting through the outermost outlets 30, contains glycerol, alkali catalyst, alcohol and soap.

An even further specific use of the invention is the mixture and reaction of two or more reactants that form an insoluble particle. Particularly, the feed tube 20 feeds two salt solutions, such as a sodium carbonate solution and a calcium sulfate solution, into the primary tube 12. The rotation of the primary tube 12 rapidly mixes the reactants while forming the mixture into a thin film on the inner surface 22. Within the thin film mixture, the two salt solutions exchange ions and during this exchange, the calcium ions and the carbonate ions combine to form fine particles of calcium carbonate.

The products of the reaction enter the separation reservoir 14 where the centrifugal action causes the insoluble calcium carbonate particles to precipitate out from the product stream in a slurry. The calcium carbonate slurry can then be easily removed from the reactor 10 through the outlets 30, separate from the other products of the reaction. The rapid mixing and the formation of the thin film put the salt solutions, and thus the different ions, in close proximity allowing an improved number of calcium ions to come into contact with carbonate ions. Therefore, the reactor 10 can have an improved reaction efficiency for forming calcium carbonate particles.

It should be noted that the residence time of a reaction in the tube reactor 10 as shown in FIG. 1 may be calculated using the following formula from U.S. Pat. No. 4,311,570 to Cowen, et al. (Cowen):

$$t=((6\pi r^2 \mu l^5)/(Q^3 f^4 \rho))^{1/4}$$

Where t is the residence time, $\rho$ is the density of the liquid, $\mu$ is the viscosity of the liquid, Q is the volumetric feed rate of the liquid, and l is the length, r is the radius, and f is the rate of rotation of the primary tube 12 in revolutions per unit time. Further, the film thickness may be calculated for a measured residence time using the following formula, also from Cowen: $(Qt)/(2\pi rl)$.

It should be noted that although the invention has been described with a cylindrical tube, myriad tube shapes may be imagined for further embodiments of the invention. For example, a tapered primary tube 12 may be required to maintain the hydrodynamics of the reaction if the thin film changes viscosity as the reaction progresses. In a further example, it may be desirable to incorporate a tapered transition between the primary tube 12 and the separation reservoir 14. In an even further example, a tapered separation reservoir 14 may be desired for certain solids that tend to contact the reservoir inner wall 26. Such solids may not readily migrate to the end plate 28 unless the separation reservoir 14 is tapered.

An advantage of the present invention may be that the rotating tube creates a thin film of process components for a continuous reaction.

A further advantage of the present invention may be that the separation of components in the film occurs in the outlet section of the invention to minimize downstream processing. Also, the separation reservoir may be integral with the reactor such that the invention provides a continuous reaction and separation in a single enclosed module. A particular advantage of an integral separation reservoir may be that as the products are removed from the system, unspent reactants continue to react to form additional products, thereby reducing the waste of unspent reactants.

An even further advantage of the present invention may be that the thin film has a low thermal inertia for rapid temperature changes and allows simplified exposure to electromagnetic fields. The thin film further allows all constituent components to be rapidly mixed on the molecular level and the shear stresses applied to the thin film by the rotating tube further promote mixing. The thin film can have a large surface area and therefore there can be excellent contact between a gaseous component and the film.

It is also useful to note that the principals for the present invention may apply to one of the following applications: precipitation of particles including organic, inorganic and metal particles with controlled shape and size distribution; coating of particles; crystallization of particles due to cooling as well as evaporation; polymerization reactions—condensation, free radical, photo as well as ionic; bio processes such as fermentation and transformation of renewable feedstock into value added products such as sugars and ethanol; catalyzed reactions such hydrogenation, oxidation, Suzuki reactions, sulphonation or other value added product; conversion of vegetable oil, waste grease and other renewable feedstock into biodiesel; milk and other related food processing where heat transfer and destruction of pathogens is essential; and the treatment of water for the destruction of active ingredients as well as removal of solids or other fluids with densities different from water.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed:

1. A method for creating a reaction product, the method comprising:
   rotating a tube having a conical section about an axis;
   providing at least one reactant to an inner surface of said tube;
   processing said at least on reactant on said inner surface;
   separating said at least one processed reactant by density with a rotating reservoir coupled to said tube;
   wherein said tube is a substantially tubular body portion having an entry port, an opposing exit port, and said axis extends between said ports through said body portion;
   said inner surface cooperates with said substantially tubular body portion; and
   said rotating reservoir is coupled to the substantially tubular body portion, such that said reservoir receives at least one processed reactant from said inner surface and separates said at least one processed reactant by density; and
   including a condenser extending from within said reservoir into said substantially tubular body permitting a condensate to flow there along into said reservoir for collecting through an outlet in said reservoir.

2. The method of claim 1, comprising:
   including an insert cooperating with said inner surface and the substantially tubular body portion for processing said at least one reactant.

3. The method of claim 1, comprising:
   controlling a temperature of said tube with heating and cooling elements surrounding said tubular body portion.

4. The method of claim 1, wherein:
   said outlet includes at least one outlet port on said reservoir for controlling an output of the processed and separated reactants from the reservoir.

5. The method of claim 1, comprising:
including one or more feed tubes for depositing process components or reactants.

6. The method of claim 5, wherein:
said one or more feed tubes deposit said process components or reactants at said entry port of said substantially tubular body portion.

7. The method of claim 5 comprising:
providing sequential addition of fluid with multiple feed tubes of said one or more feed tubes at various points on the substantially tubular body portion.

8. The method of claim 7 comprising:
facilitating a propagation of reagents by varying a range of a slope of said conical section, wherein said conical section has a range of said slope that is varied so as to facilitate propagation of said at least one reactant, or said slope is based on the viscosity or the type of said at least one reactant being introduced.

9. The method of claim 8 wherein a surface of the conical section is profiled to have a structure to increase turbulence in reactant flow.

10. The method of claim 9 wherein the profiled structure includes a grooved or sandblasted surface.

* * * * *